(12) United States Patent
Oshima et al.

(10) Patent No.: US 8,773,698 B2
(45) Date of Patent: Jul. 8, 2014

(54) PRINTING CONTROL SERVER AND PRINTING SYSTEM

(75) Inventors: Yasuhiro Oshima, Matsumoto (JP); Hirotaka Akamatsu, Matsumoto (JP); Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 344 days.

(21) Appl. No.: 13/360,286

(22) Filed: Jan. 27, 2012

(65) Prior Publication Data
US 2012/0194863 A1 Aug. 2, 2012

(30) Foreign Application Priority Data
Jan. 27, 2011 (JP) ................. 2011-014855

(51) Int. Cl.
*G06F 3/12* (2006.01)
(52) U.S. Cl.
USPC ...................................... 358/1.15
(58) Field of Classification Search
CPC ... G06F 3/1204; G06F 3/1224; G06F 3/1226; G06F 3/1231; G06F 3/1286; G06F 3/1288; G06F 3/1292
USPC ...................................... 358/1.15
See application file for complete search history.

(56) References Cited

U.S. PATENT DOCUMENTS

2008/0068646 A1* 3/2008 Kobayashi ............... 358/1.15
2012/0019864 A1* 1/2012 Mickeleit et al. ......... 358/1.15
2012/0044536 A1* 2/2012 Hall et al. ................. 358/1.15

FOREIGN PATENT DOCUMENTS

JP 2008-071257 A 3/2008

* cited by examiner

*Primary Examiner* — Fred Guillermety
(74) *Attorney, Agent, or Firm* — Kilpatrick Townsend & Stockton LLP (57) ABSTRACT

A printing control server includes a storage section which stores a printer identifier and a network identifier so as to be linked, a search response section which acquires the network identifier from a transmission origin of a search request when the search request has been received and transmits information, which is able to determine the printer identifier stored so as to be linked to the acquired network identifier, to the transmission origin of the search request, a printing request reception section which receives a printing request which includes a printing target and is linked to a printer identifier, a printing data preparation section which prepares printing data based on the printing target, and a printing data transmission section which transmits the printing data to the printer which corresponds to the printer identifier which is linked to the printing request.

7 Claims, 7 Drawing Sheets

PRINTING CONTROL SERVER AND PRINTING SYSTEM

CROSS REFERENCES TO RELATED APPLICATIONS

The entire disclosure of Japanese Patent Application No. 2011-014855, filed Jan. 27, 2011 is incorporated by reference herein.

BACKGROUND

1. Technical Field

The present invention relates to a printing control server and a printing system, and in particular, relates to a cloud computing system which receives a printing request via the Internet with regard to a printer which is connected to the Internet.

2. Related Art

In the past, there was a cloud computing system which is provided with a function where an electronic mail is received and the main body of an electronic mail or an attached file is printed (for example, JP-A-2008-71257). The cloud computing system (referred to below simply as a printing system) is provided with a server which generates printing data which corresponds to a predetermined printer based on the main body of an electronic mail or an attached file when a predetermined electronic mail has been received and a printer which executes printing by acquiring the printing data from the server. Accordingly, a user of the printing system is able to use the printer even in a case where a printer driver is not installed in each client such as a PC (Personal Computer) or smartphone.

In the printing system, when a printer registration process, which includes an electronic mail address being allocated to a printer in order that a printing target is received, is carried out on a server, an arbitrary user who knows the electronic mail address is able to use the printer.

Here, an arrangement is assumed where a printer which is connected to a wireless LAN access point is registered in the printing system described above and an unspecified large number of users who are in locations where it is possible for radio waves to be received from the wireless LAN access point are able to freely use the printer. In an arrangement such as this, it is necessary that the existence of the printer which is connected to the wireless LAN access point and the necessary information for using the printer be notified with regard to the unspecified large number of users who are in location where it is possible for radio waves to be received from the wireless LAN access point.

SUMMARY

An advantage of some aspects of the invention is that it is possible for an unspecified large number of users to easily use a printer which is connected to a wireless LAN.

A printing control server according to an aspect of the invention is provided with a storage unit which stores a printer identifier, which is allocated to a predetermined printer, and a network identifier, which is an identifier of a wireless LAN to which the printer is connected, so as to be linked, a search response unit which acquires the network identifier from a transmission origin of a search request when the search request has been received and transmits information, which is able to determine the printer identifier stored so as to be linked to the acquired network identifier, to the transmission origin of the search request, a printing request reception unit which receives a printing request which includes a printing target and is linked to a printer identifier, a printing data preparation unit which prepares printing data based on the printing target, and a printing data transmission unit which transmits the printing data to the printer which corresponds to the printer identifier which is linked to the printing request.

Even if a terminal to which radio waves from the wireless LAN access point reach is not connected to the wireless LAN where the wireless LAN access point is a hub, it is possible to acquire an identifier such as a SSID (Service Set Identifier) or a BSSID (Basic Service Set Identifier) of the wireless LAN and it is possible to connect to a data communication network which is outside of the wireless LAN. Accordingly, according to the invention, the printing control server is able to receive the search request from the terminal which receives the radio waves from the wireless LAN access point and to acquire the identifier of the wireless LAN. The wireless communication terminal which is the transmission origin of a search request is able to transit the printing request which is linked to the printer identifier due to the transmission of the printer identifier, which is stored to be linked to the identifier of the wireless LAN which is acquired in this manner, to the transmission origin of the search request from the printing control server. That is, according to the invention, an arbitrary wireless terminal, which is in a location where it is possible for radio waves to be received from the wireless LAN access point, is able to transmit a search request for searching for a printer which is able to be used, to acquire the identifier of the printer which is able to be used, and to transmit a printing request with regard to the printer for which an identifier has been acquired. Accordingly, according to the invention, it is possible for the unspecified large number of users to easily use the printer which is connected to the wireless LAN from the wireless communication terminal without direct communication with the printer which is registered on the printing control server, and in addition, without connection to the wireless LAN where the wireless LAN access point is the hub.

In the printing control server in this case, the search request unit may transmit information on a plurality of the printer identifiers to the transmission origin of a search request so that one is selected from the information on the plurality of printer identifiers in a case where there is the plurality of printer identifiers which are stored so as to be linked to the network identifier which corresponds to the wireless LAN identifier which is acquired from the transmission origin of the search request.

In the printing control server in this case, the search request unit may transmit a web page for inputting to the transmission origin of a search request when the search request has been received, acquire the wireless LAN identifier via the web page for inputting, and transmit a search request web page, which is linked to the printer identifier stored so as to be linked to the current wireless LAN identifier, to the transmission origin of the search request as information which is able to determine the printer identifier.

In the printing control server in this case, the storage unit may store the electronic mail address which is allocated to the predetermined printer so as to be linked to the printer identifier as a registration electronic mail address and the search request reception unit may transmit an electronic mail with the registration electronic mail address as a destination as a printing request.

In the printing control server in this case, the wireless LAN identifier may be an SSID or a BSSID.

It is possible to completely specify the wireless LAN access points in a unique manner by using both the SSID and the BSSID as the identifiers of the wireless LAN.

A communication terminal according to another aspect of the invention is provided with a search request transmission section which transmits a search request, a network identifier transmission section which transmits a network identifier, and a printing request transmission section which receives information which is able to determine the printer identifier and transmits a print request which is linked to a printer identifier and includes a print target, with regard to a printing control server which is provided with a storage section which stores a printer identifier, which is allocated to a predetermined printer, and a network identifier, which is an identifier of a wireless LAN to which the printer is connected, so as to be linked, a search response section which acquires the network identifier from a transmission origin of a search request when the search request has been received and transmits information, which is able to determine the printer identifier stored so as to be linked to the acquired network identifier, a printing request reception section which receives a printing request which includes a printing target and is linked to a printer identifier, a printing data preparation section which prepares printing data based on the printing target, and a printing data transmission section which transmits the printing data to the printer which corresponds to the printer identifier which is linked to the printing request.

Here, the function of each unit which is described according to the aspects is able to be realized using hardware resources where the functions are specified by the configuration itself, hardware resources where functions are specified by a program, or a combination of both of these. In addition, the function of each unit is not limited to being realized by hardware resources which are each physically independent from each other. For example, the server which is described according to the aspects is not limited to being realized by one computer and the server may be realized as a group where a plurality of computers is combined with each of the units being respectively allocated. Furthermore, the invention is also established as a method, as a computer program which is realized by a communication terminal and a printer, or as a recording medium of a program. Of course, the recording medium of the computer program may be a magnetic recording medium, a magneto-optical recording medium, or may be a recording medium which is developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, embodiments of the invention will be described while referencing the attached diagrams. Here, the same reference numerals are attached to corresponding constituent elements in each diagram and overlapping descriptions are not included.

1. Configuration

Figure 1:
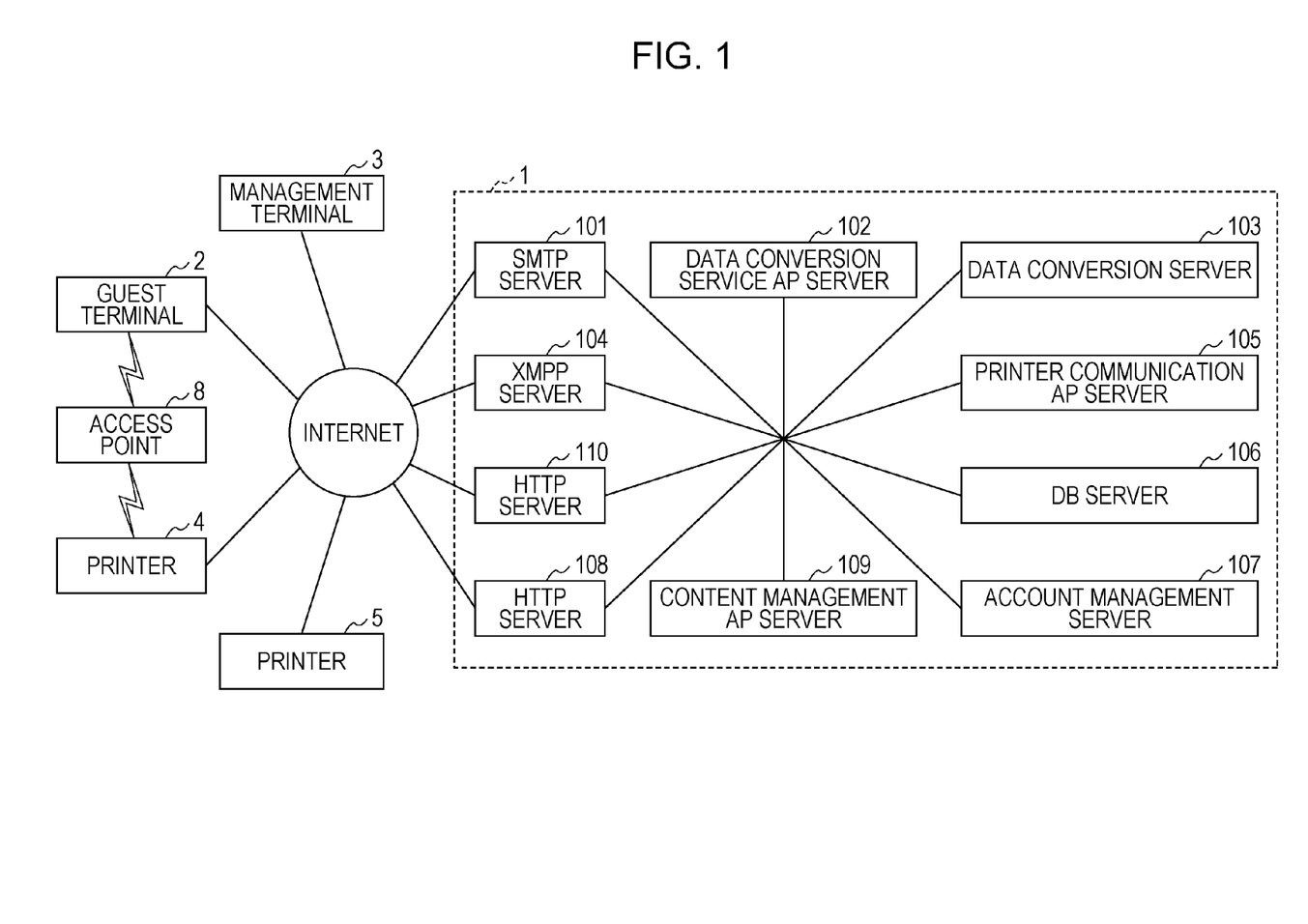
FIG. 1 is a block diagram illustrating a printing system.

FIG. 1 is a block diagram illustrating a printing system as an embodiment of the invention. The printing system is configured as a cloud computing system where it is possible to print a main body of an electronic mail or an attached file by transmitting an electronic mail to an electronic mail address which corresponds to printers 4 or 5 which are registered, and is provided with a printing control server 1 and a plurality of printers 4 and 5.

The printing control server 1 of the present embodiment is configured from an SMTP server 101, a data conversion service application (AP) server 102, a data conversion server 103, an XMPP server 104, a printer communication AP server 105, a DB server 106, an account management server 107, an HTTP server 108, a content management AP server 109, and an HTTP server 110.

The SMTP server 101 is a server which has a function of transmitting and receiving electronic mails.

The data conversion service AP server 102 which is a printing request reception unit is an application server which has a function of extracting the main body and the attached file from an electronic mail which is received via the SMTP server 101 as a printing request and transferring the main body and the attached file to the data conversion server 103 as a printing target.

The data conversion server 103 which is a data conversion unit is a server which has a function of converting a file which is acquired as the printing target from the data conversion service AP server 102 as preview data or printing data.

The DB server 106 which is a storage unit is a database server which manages various types of information on the printer 4 and 5 and stores the printing data.

The XMPP server 104 is a server which has a function of transmitting and receiving various types of information by communication with the printer 4 and 5 using XMPP.

The printer communication AP server 105 which is the printing data transmission unit is an application server which has a function of generating printing waiting information and the like.

The account management AP server 107 which is a search response unit is an application server which relays between the HTTP server 110 and the other servers and has functions such as registering the printers 4 and 5 in the printing system and generating a printing control page.

The HTTP server 108 is a server which has a function of communicating with the printers 4 and 5 using HTTP.

The content management AP server 109 is an application server which relays between the HTTP server 108 and the other servers and has functions of acquiring a printing job from the DB server 106, transferring the printing job to the HTTP server 108, and the like.

The HTTP server 110 which is a search response unit is a server which has a function of communicating with a guest terminal 2 and a management terminal 3 using HTTP.

Figure 2A:
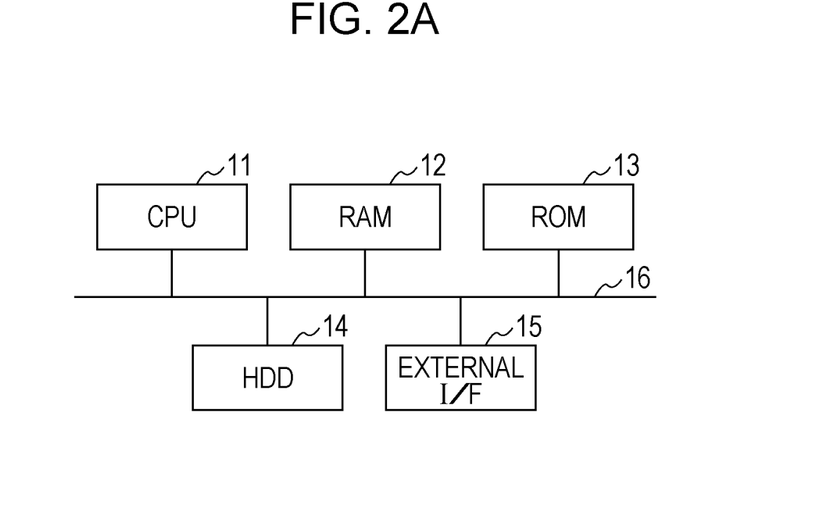
FIG. 2A is a block diagram illustrating a configuration of a server and FIG. 2B is a block diagram illustrating a configuration of a printer.

Each of the SMTP server 101, the data conversion service AP server 102, the data conversion server 103, the XMPP server 104, the printer communication AP server 105, the DB server 106, the account management server 107, the HTTP server 108, the content management AP server 109, and the HTTP server 110 are provided with a CPU 11, a RAM 12, a ROM 13, a hard disk drive (HDD) 14, an external interface (I/F) 15, and an internal interface (I/F) 16 which is connected these as shown in FIG. 2A. An activation program is stored in the ROM 13. The HDD 14 stores an operating system (OS)

and a computer program for realizing each of the functions which are described above. These programs are loaded into the RAM 12 and are executed using the CPU 11. The external I/F 15 is configured with an interface or the like for connecting an interface for connection with other servers, the printers 4 and 5, the guest terminal 2, the management terminal 3 and the like via the Internet and peripheral devices.

Figure 2B:
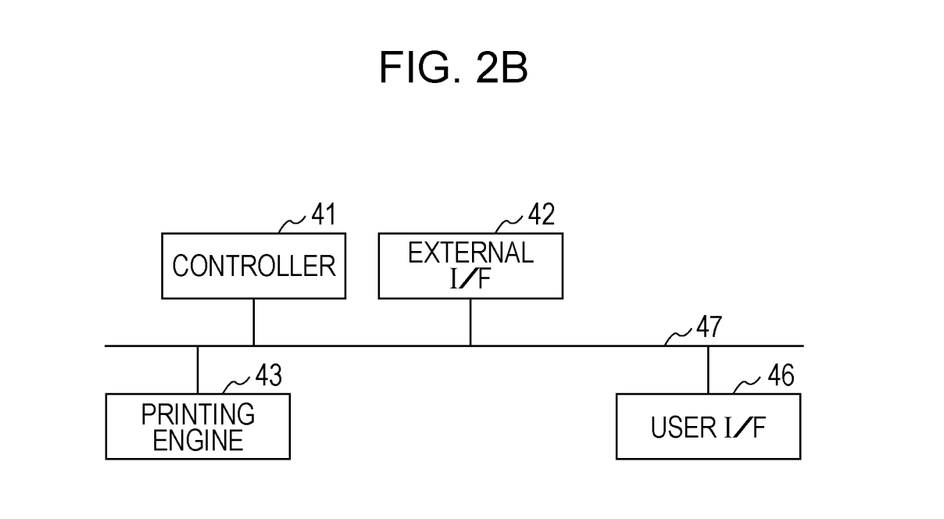

Each of the printers 4 and 5 are provided with a controller 41, an external I/F 42, a user I/F 46, a printing engine 43, and an internal I/F 47 which is connected to these as shown in FIG. 2B. The controller 41 is formed from a CPU, a nonvolatile memory, a RAM, an ASIC, and the like and executes a process for controlling the operation of the printing engine 43 by executing a control program which is stored in the nonvolatile memory. In addition, the controller 41 registers the printers 4 and 5 in the printing control server 1 by communicating with the management terminal 3 and the printing control server 1 using the execution of a web service program which is stored in the nonvolatile memory, executes a process for acquiring printing data from the printing control server 1, and acquires information on the wireless LAN by communicating with an access point 8. The printing engine 43 is provided with an actuator, a sensor, a driving circuit, and a mechanical component for executing printing using a printing method which is common knowledge such as an ink jet method or a laser method. The external I/F 42 includes an interface for connecting to the printing control server 1 and the management terminal 3 via the Internet and an interface for connecting to a wireless LAN and a wired LAN. The user I/F 46 is an operation panel which is configured by a display, operation keys, and the like.

The access point 8 is a wireless LAN access point. In the embodiment, the printer 4 is disposed in a state of being able to communicate with the access point 8 in a range where radio wave reach from the access point 8.

2. Setup Sequence

Figure 3:
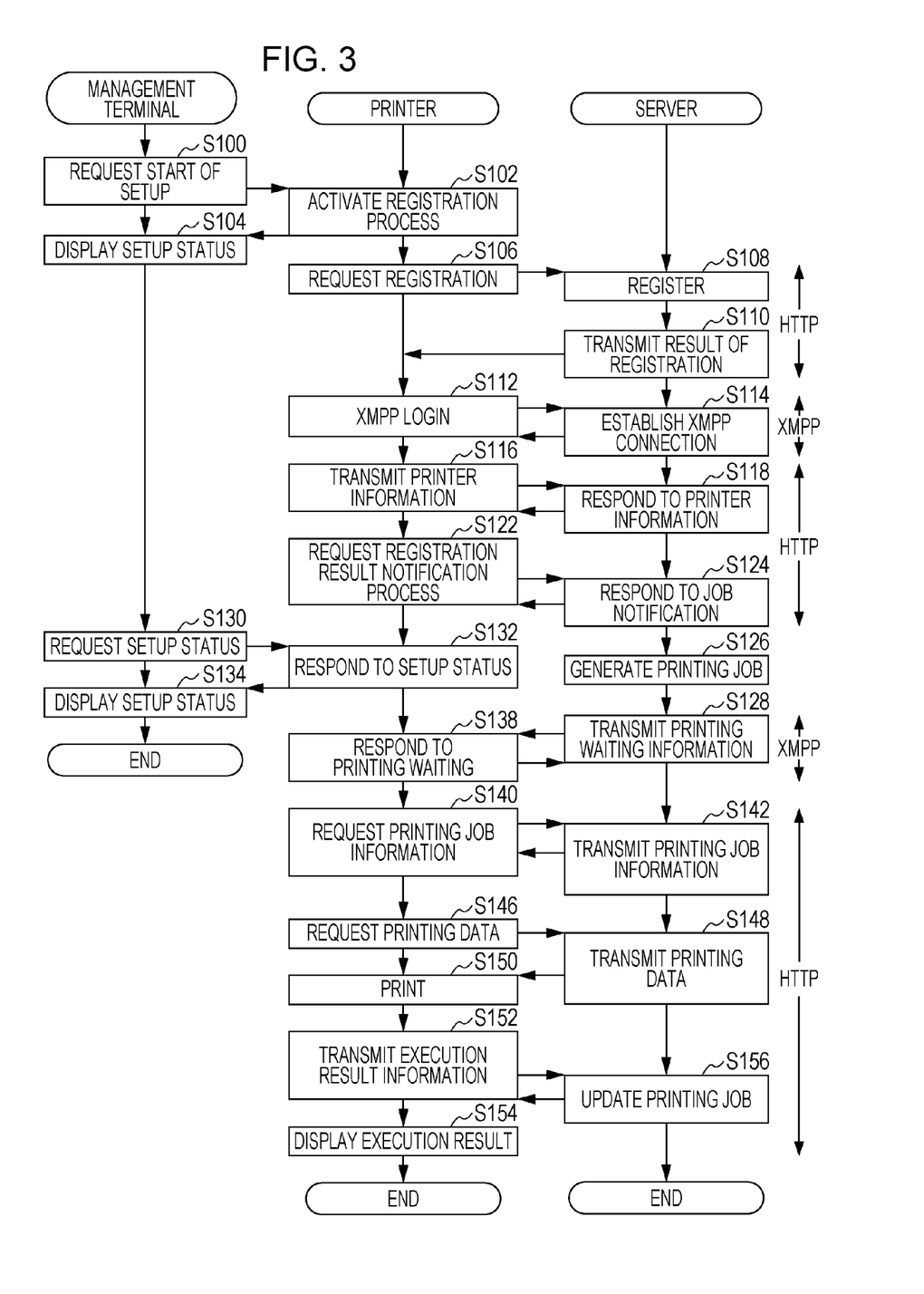
FIG. 3 is a sequence diagram illustrating a setup sequence.

The printers 4 and 5 are embedded into the printing system due to being registered in the printing control server 1 and are able to execute printing according to a printing request which is received by the printing control server 1. FIG. 3 is a diagram illustrating a setup sequence for registering the printers 4 and 5 in the printing control server 1. In the embodiment, an example will be described where the printer 4 is registered in the printing control server 1 by operating the management terminal 3 formed from a PC (Personal Computer) which is owned by the owner of the printer 4.

First, the management terminal 3 which is executed using a web server or the like transmits a setup start request to the printer 4 by communicating with the printer 4 using HTTP (S100). For example, the management terminal 3 transmits a DNS mode, a primary DNS, a secondary DNS, a proxy mode, an address of a proxy server, or a port number of a proxy server as the setup start request to the URL of the printer 4 which corresponds to the setup start request using HTTP.

The printer 4 which acquires the setup start request activates the registration process and transmits registration state information to the management terminal 3 using HTTP (S102). The registration state information includes reception or non-reception (success or failure), a DNS mode, a primary DNS, a secondary DNS, a proxy mode, an address of a proxy server, a port number of a proxy server, a web server mode, a URL, registration state of the printer 4 to the printing control server 1 (registration completed or unregistered), URL of a management page which corresponds to the printer 4, a login password of the management page which corresponds to the printer 4, an electronic mail address which is allocated to the printer 4, the connection state of the HTTP server 108 and the printer 4, and the connection state of the XMPP server 104 and the printer 4. At this stage, since the registration of the printer 4 has not been carried out in the printing control server 1, the registration state information which includes the registration state of "unregistered" is transmitted to the management terminal 3.

The management terminal 3 which receives the registration state information displays the setup status on a screen based on the registration state information which has been received (S104). At this stage, for example, text or an image which indicates that setup is in progress is displayed on the screen of the management terminal 3 using a browser.

The printer 4 which transmits the registration state information according to the setup start request transmits a model unique ID of the printer 4, the serial number of the printer 4, an identifier of the wireless LAN to which the printer 4 is connected (information which is able to specify to which wireless LAN is there a connection. For example, SSID or ESSID and BSSID. In the example below, SSID and BSSID is used), and an existing information deletion flag to a URL of the HTTP server 108 which corresponds to the registration request as the registration request which corresponds to the printer 4 using HTTP (S106).

The printing control server 1 which acquires the registration request in the HTTP server 108 registers the printer 4 in the printing control server 1 as an output unit of the printing system based on the registration request (S108).

Specifically, the account management AP server 107 which acquires the parameters of the registration request from the HTTP server 108 allocates an internal ID which corresponds to the model unique ID and the serial number of the printer 4, an XMPP login password, a URL of a management page, a management page password, and an electronic mail address to the printer 4 so as to not overlap with other printers while referencing the registration information of the registration information of other printers which are already registered in the DB server 106. It is not limited to the internal ID being allocated based on the device model ID and the serial number of the printer 4, but even in a case where the serial number is allocated to printers with a system which is different for each model, it is possible to allocate the internal ID which is different for each model of the printer to the printer 4 by allocating the internal ID based on the model unique ID and the serial number of the printer 4. The management page is a web page for editing this information which is stored in the DB server 106 using HTTP.

Then, the account management AP server 107 stores the XMPP login password, the URL of the management page, the management page password, and the electronic mail address in the DB server 106 as the registration information of the printer 4 so as to correspond to the internal ID which corresponds to the model unique ID and the serial number of the printer 4.

Furthermore, the account management AP server 107 registers the electronic mail address which is allocated to the printer 4 in the SMTP server 101. It is possible for the printing control server 1 to receive an electronic mail as a printing request where the printer 4 is the output unit by the electronic mail address which is allocated to the printer 4 being registered in the SMTP server 101.

In addition, the account management AP server 107 registers the internal ID which is allocated to the printer 4 in the XMPP server 104 so as to correspond to the XMPP login password. An XMPP JID for the XMPP server 104 to communicate with the printer 4 using XMPP becomes "internal ID"@"XMPP domain name of the XMPP server 104". It is possible for the printer 4 and the printing control server 1 to communicate using XMPP by the internal ID of the printer 4 and the XMPP login password being registered in the XMPP server 104 as XMPP connection information. Here, in a case where a plurality of the XMPP servers are provided to the printer control server 1 so as to disperse the load, it is necessary for the XMPP server which corresponds to a certain printer to be allocated to each printer and registered in the DB server 106.

The account management AP server 107, where the printer 4 is registered in the printing control server 1 as the output unit of the printing system, transmits the registration result information of the printer 4 to the printer 4 which is the transmission origin of the registration request via the HTTP server 108 (S110). The internal ID which is allocated to the printer 4, the XMPP login password, the URL of the management page, the management page password, the electronic mail address, the domain name of the XMPP server 104, and the reception or non-reception of the registration request (success or failure) are included in the registration result information. Here, in a case where a plurality of the XMPP servers are provided to the printer control server 1 so as to disperse the load, it is necessary that the domain name of the XMPP server which is allocated to the printer 4 is notified to the printer 4, but in a case where a XMPP server which communicates with all of the printers which are registered in the printing control server 1 is shared, it is not necessary that the domain name of the XMPP server is necessarily notified to the printer 4.

The printer 4 which acquires the registration information from the HTTP server 108 stores the internal ID which is allocated to the printer 4, the XMPP login password, the URL of the management page, the management page password, the electronic mail address, the domain name of the XMPP server 104 in a nonvolatile memory, generates an XMPP JID from the internal ID and the XMPP domain name, and transmits the XMPP JID and the XMPP login password to the XMPP server 104 as the XMPP connection information (S112).

The XMPP server 104 which acquires the XMPP JID and the XMPP login password from the printer 4 establishes XMPP communication with the printer 4 and transmits the XMPP connection result (success or failure) to the printer 4 (S114). When the XMPP connection is successful at this time, the XMPP connection of the printer 4 and the XMPP server 104 continues until the power source of the printer 4 is cut off.

When the XMPP connection with the printing control server 1 is established, the printer 4 transmits printer information to the printing control server 1 (S116). The printer information includes the internal ID which is allocated to the printer 4, the identifier such as the SSID (or ESSID) and the BSSID of the wireless LAN to which the printer 4 is connected, a version of the communication arrangement, printer menu type information (destination information), printer submenu type information (destination information), and printer language information, and is transmitted to the URL of the HTTP server 108 which corresponds to the printer information using HTTP.

BSSID is an identifier of a BSS (Basic Service Set) and normally is the same as the MAC address of the access point 8. With regard to the SSID being an identifier of the wireless LAN in a case where there is only a single access point in the local network, the ESSID is each identifier of the wireless LAN (BSS) in an ESS (Extended Service Set). With regard to the BSSID being an identifier which is able to uniquely specify the access point globally, the SSID and the ESSID are identifiers which are uniquely set by the user. Accordingly, in a case of attempting to specify the access point from a combination of the SSID or ESSID and the internal ID of the printer, while in most cases it is possible to uniquely specify the access point, there is no guarantee that it is possible for the access point to be completely specified. In addition, since it is possible to become impersonate a specific network device by falsifying the MAC address, there are cases where the access point may not be able to be uniquely specified with only the BSSID. Therefore, in the embodiment, since both of the SSID (or the ESSID) and the BSSID are registered in the printing control server 1 as the identifier of the wireless LAN to which the printer is connected, both the SSID (or the ESSID) and the BSSID are transmitted as the registration request. By the printer information which includes the language information and the like being transmitted to the printing control server 1, it is possible for printing data such as a registration report or a printing report to be generated in the printing control server 1 according to the destination of the printer 4.

When the HTTP server 108 receives the printer information from the printer 4, the content management AP server 109 stores the printer information which includes the SSID (or the ESSID) and the BSSID in the DB server 106 so as to correspond to the internal ID and transmits a reception result (success or failure) to the printer 4 which is the transmission origin (S118). The printer information of the printer 4 is stored in the DB server 106 until the XMPP connection with the printer 4 is complete. By storing the printer information which includes the SSID (or the ESSID) and the BSSID in the DB server 106 so as to correspond to the internal ID, the SSID (or the ESSID) and the BSSID of the wireless LAN to which the printer 4 is connected to is able to be linked to the electronic mail address which is allocated to the printer 4.

The printer 4 which receives the reception result (success) of the printer information transmits a registration result notification job generation request to the HTTP server 108 (S122). The registration result notification job is a printing job for printing the registration content of the printer 4 to the printing control server 1 using the printer 4. Specifically, the internal ID is transmitted to the URL of the HTTP server 108 which corresponds to the registration result notification job generation result as the registration result notification job generation request.

The HTTP server 108 which receives the registration result notification job generation request transmits the reception result (success or failure) to the printer 4 which is the transmission origin (S124).

When the reception result (success) of the registration result notification job generation request is transmitted from the HTTP server 108, the printing control server 1 generates a registration result notification job in order for the printer 4 to print the registration report (S126). Specifically, it is as follows. First, the content management AP server 109 acquires the internal ID of the printer 4 from the registration result notification job generation request and transfers to the printer communication AP server 105 by acquiring information which is to be notified to the user of the management terminal 3 such as the URL of the management page, the management page password, the electronic mail address, and the like which are stored so as to be linked to the internal ID which has been acquired and the model unique ID of the printer 4 which is stored to correspond to the internal ID from the DB server 106. Next, the printer communication AP server 105 requests the information which is to be notified to the user of the management terminal 3 by the generation of the printing data for printing as the registration report using the printer 4 corresponding to a job ID and a model ID in the data conversion service AP server 102. The data conversion service AP server 102 which receives the request generates the printing data which corresponds to the model unique ID in the data conversion server 103. Next, the printer communication AP server 105 acquires the printing data from the data conversion server 103 and stores the printing data in the DB server 106 so as to correspond to the internal ID and the job ID as the printing job of the printer 4.

The printing control server 1 which generates the registration result notification job notifies the printer 4 which is the transmission origin of the registration request of the generation of a new printing job using XMPP (S128). Specifically, the printer communication AP server 105 notifies the printer 4 of printing waiting information which indicates that a new printing job of the printer 4 has been generated via the XMPP server 104. At this time, the XMPP server 104 specifies the other party of the XMPP communication to the printer 4 which corresponds to the new printing job based on the internal ID which is acquired from the printer communication AP server 105 and transmits the printing waiting information to the printer 4 using XMPP. The process, which is from the generation of the printing job up until the printing waiting information is transmitted to the printer 4 in this manner, is able to be automatically executed by the printing control server 1 since the printing waiting information is transmitted using XMPP and polling from the printer 4 is not necessary. Accordingly, it is possible for the generation of the printing job to be immediately notified to the printer 4, and in addition, it is possible for the printer 4 to be notified of the generation of the printing job with a minimum amount of communication.

The printer 4 which acquires the printing waiting information transmits the reception result (success or failure) to the XMPP server 104 using XMPP (S138).

Next, the printer 4 requests the printing job information, which is necessary for the printing data to be acquired, from the printing control server 1 (S140). Specifically, the printer 4 transmits the internal ID of the printer 4 to the URL of the HTTP server 108 which corresponds to the request for the printing job information using HTTP.

The printing control server 1 which receives the request for the printing job information transmits the reception result (success or failure), the job ID, the URL of the HTTP server 108 which corresponds to the job ID, and the type of page description language of the printing data to the printer 4 as the printing job information (S142). Specifically, the content management AP server 109 acquires the internal ID which is acquired by the HTTP server 108 as a request for the printing job information and transfers the job ID, the printing data, and the page description language of the printing data which are stored to correspond to the internal ID to the HTTP server 108 by being acquired from the DB server 106. The HTTP server 108 generates a URL which receives a printing data acquisition request which corresponds to the job ID and transmits the reception result (success or failure), the job ID, the URL which receives the printing data acquisition request, and the type of page description language of the printing data to the printer 4 as the printing job information using HTTP.

The printer 4 which acquires the printing job information waits for the printer 4 to be in an idle state and requests the printing data when in an idle state (S146). Specifically, the printer transmits the internal ID of the printer 4 to the URL of the HTTP server 108 which receives the printing data acquisition request as the printing data acquisition request via HTTP.

The printing control server 1 which requests the printing data transmits the reception result (success or failure) and the printing data which is requested to the printer 4 using HTTP (S148). Specifically, the HTTP server 108 transmits the printing data which corresponds to the URL which receives the printing data request and the reception result to the printer 4 using HTTP.

The printer 4 which acquires the printing data performs analysis of the printing data based on the page description language of the printing data and executes the printing of the registration report based on the printing data (S150).

The printer 4 which has completed printing transmits the execution result information to the HTTP server 108 (S154). Specifically, the printer 4 transmits the internal ID of the printer 4, the job ID where the printing was executed, the execution result of the printing job (success or failure), and the reason for the execution result (normal, paper jam, out of ink, or the like) to the URL of the HTTP server 108 which corresponds to the execution result information (S152).

The printing control server 1 which acquires the execution result information in the HTTP server 108 updates the printing job based on the execution result information (S156). Specifically, the HTTP server 108 transmits the reception result (success or failure) of the execution result information to the printer 4 and the content management AP server 109 deletes the printing data which corresponds to the job ID from the DB server 106 if the printing job execution result indicates a success based on the execution result information which is received by the HTTP server 108.

In the execution of the setup sequence described above, the management terminal 3 which transmits the setup start request periodically requests the setup status from the printer 4 (S130). Specifically, a setup status request is transmitted to the URL of the printer 4 which corresponds to the setup status request.

The printer 4 which receives the setup status request transmits the registration state information to the management terminal 3 using HTTP (S132). The registration state information is the same as the content which the printer 4 transmits to the management terminal 3 immediately after acquiring the setup start request in S102.

The management terminal 3 which receives the registration state information displays the registration state on a screen based on the registration state information which was received in the same manner as S104 (S134). At a stage where the registration of the printer 4 to the printing control server 1 is complete, for example, the URL of the management page, the management page password, the electronic mail address, and the like are displayed on the screen of the management terminal 3.

In the setup sequence described above, the reception or non-reception of the registration request, the registration result information, the XMPP connection result, the reception result of the printer information, and the reception result of the registration result notification job generation request are transmitted from the printing control server 1 to the printer 4 in a process where the printer 4 is registered in the printing control server 1 while the printer 4 is connected using HTTP (Hyper Text Transfer Protocol) and XMPP (eXtensible Messaging and Presence Protocol). This information indicates the connection or non-connection of the HTTP connection and the XMPP connection between the printer 4 and the printing control server 1 and whether or not registration, which is necessary for the printing control server 1 to process the printing request with regard to the printer 4, has been performed. Accordingly, it is possible for the connection or non-connection of the printer 4 and the printing control server 1 and the registration or non-registration of the printer 4 with regard to the printing control server 1 based on this information to be printed by the printer 4 or displayed on the display of the user I/F 46. As a result, it is possible for the user to be reliably notified on whether or not the printer 4 is registered in the printing system which is a cloud computing system where the main body of an electronic mail or an attached file is able to be printed by an electronic mail being transmitted to the electronic mail address which corresponds to the printer 4.

3. Login Sequence

Figure 4:
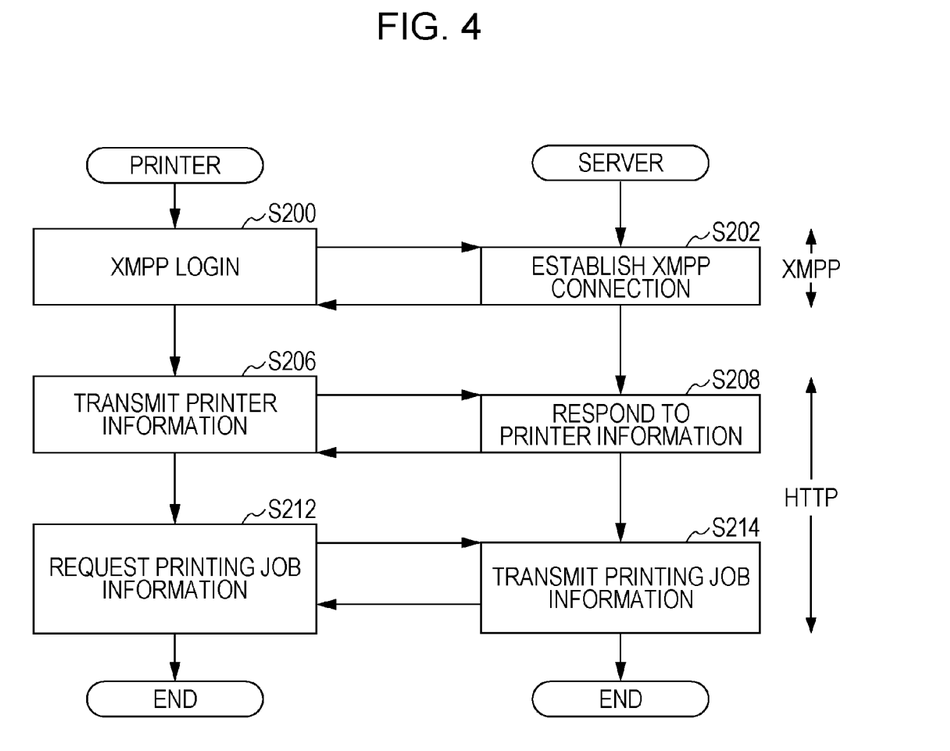
FIG. 4 is a sequence diagram illustrating a login sequence.

FIG. 4 is a diagram illustrating a login sequence. The login sequence starts when the power source is input by the power source button being pressed again after the power source is cut off by the power source button of the printer 4 being pressed by the user after the setup sequence has been completed. In the login sequence, the printer 4 performs an initialization process for each section, establishes an XMPP connection with the printing control server 1, and performs confirmation of the printing job.

Specifically, in the same manner as S112 of the setup sequence, the printer 4 transmits the XMPP connection information to the XMPP server 104 (S200). The XMPP server 104 which acquires the XMPP connection information establishes the XMPP connection in the same manner as S114 (S202).

The printer 4 where the XMPP connection with the printing control server 1 has been established transmits the printer information to the printing control server 1 using HTTP in the same manner as S116 of the setup sequence (S206). That is, the transmission of the printer information is executed each time the XMPP connection is established with the printing control server 1. The server which acquired the printer information transmits the reception result to the printer 4 using HTTP in the same manner as S118 and the printer information is stored until the completion of the XMPP connection (S208).

The printer 4 which transmits the printer information to the printing control server 1 requests printing job information from the printing control server 1 using HTTP in the same manner as S140 of the setup sequence (S212). The printing control server 1 which acquires the request for printing job information transmits the printing job information to the printer 4 using HTTP in the same manner as S142 (S214). The printer 4 which acquires the printing job information executes printing by requesting the printing data if there is a printing job. By the printer 4 automatically acquiring the printing job information after the input of the power source in this manner, it is possible for the printer 4 to execute the printing job, which is generated in the printing control server 1 while the power source is cut off, immediately after the power source is input.

4. Search Sequence and Printing Sequence

Figure 5:
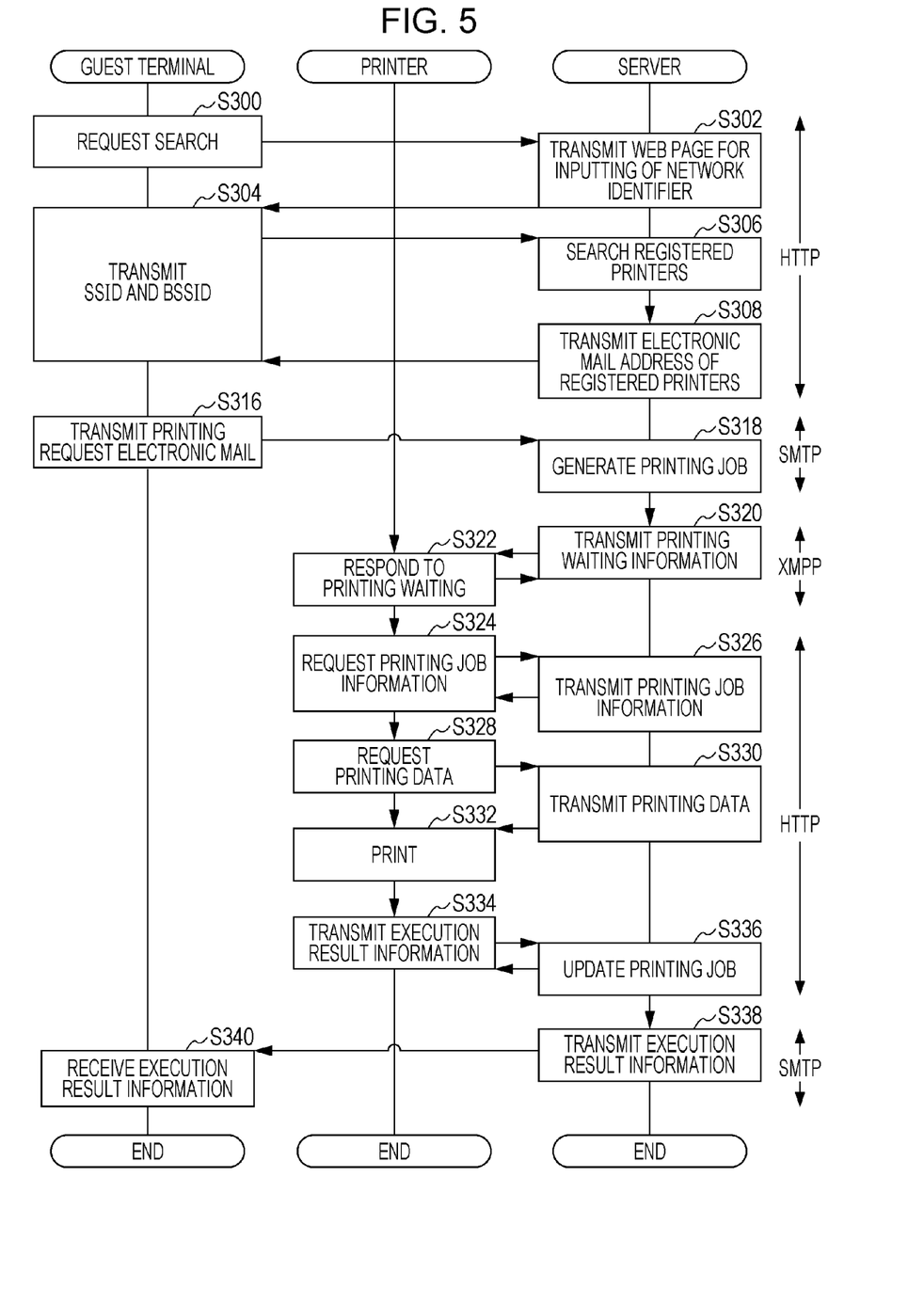
FIG. 5 is a sequence diagram illustrating a search sequence and a printing sequence.

FIG. 5 is a sequence diagram illustrating a search sequence and a printing sequence. The printing sequence is started by an electronic mail which is a printing request being transmitted from the management terminal 3 or the guest terminal 2 to the electronic mail address which is registered to correspond to the printer where printing is intended (S316). The printing control server 1 processes the main body of the electronic mail or the attached file, which are received in the electronic mail address which is registered, as the printing target of the corresponding printer as will be described later. As a result, when the user transmits the electronic mail where the main body or the attached file is the printing target, there is processing using the printing control server 1 as the printing request with regard to the printer which corresponds to the electronic mail. The electronic mail address which is the destination of the printing request which is different for each printer is display on a screen of the management terminal 3 or printed using the printer 4 as already described in the setup sequence. Accordingly, the management user who registers the printer 4 in the printing control server 1 using the management terminal 3 and the user which is notified of the electronic mail address from the management user are able to transmit the printing request with regard to the printer 4 to the printing control server 1 using an arbitrary terminal which is connected to the Internet.

In addition, in a case where the printer 4 is connected to the wireless LAN of the access point 8, the printing control server 1 has a function for an arbitrary user which is able to receive radio waves from the access point 8 to search for and using the printer 4 which is registered in the printing control server 1. By the user transmitting a search request via the Internet from the guest terminal 2 in a location where radio waves from the access point 8 are able to be received (S300), the function is executed in the search sequence which is activated. The search request is transmitted with regard to the URL of the HTTP server 110 which corresponds to the search request using HTTP. Specifically, for example, the guest user displays a portal site 61 of the printing system which is shown in FIGS. 6A to 6D using the web browser of the guest terminal 2, and when a printer search button 61b is clicked, the search request is transmitted to the URL which is embedded in the printer search button 61b.

Figure 6A:
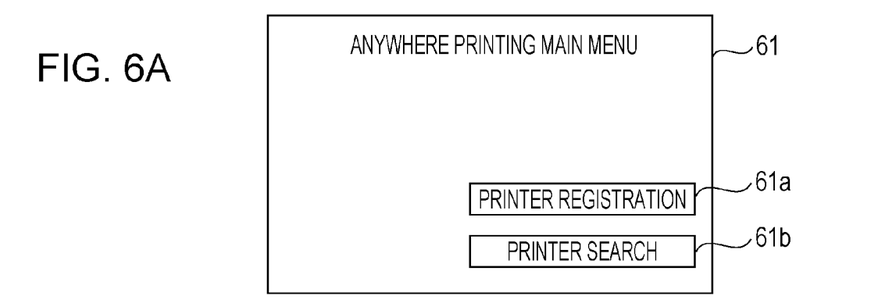
FIGS. 6A to 6D are diagrams illustrating a web page.
Figure 6B:
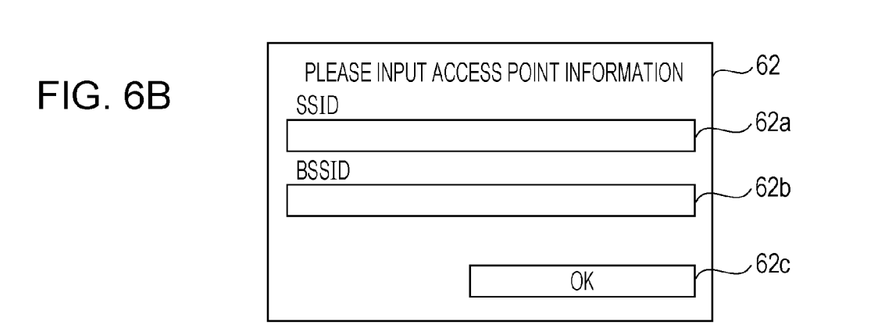

The printing control server 1 which receives the search request transmits a web page, which is for inputting the network identifier as a web page for acquiring the network identifier from the transmission origin of the search request, to the guest terminal 2 which is the transmission origin of the search request (S302). Specifically, when the HTTP server 110 receives the search request, as shown in FIG. 6B, a network identifier inputting web page 62, which includes text boxes 62a and 62b for inputting the SSID (or ESSID) and the BSSID which are identifiers of the wireless LAN access point from which the guest terminal 2 receives radio waves and a button 62c for transmitting text which is input into the text boxes 62a and 62b to the printing control server 1, is transmitted to the guest terminal 2 from the HTTP server 110.

The user of the guest terminal 2 which acquires the network identifier inputting web page 62 transmits the SSID (or ESSID) and the BSSID which are network identifiers of the access point 8 from which the guest terminal 2 receives radio waves to the printing control server 1 via the network identifier inputting web page 62 (S304). Specifically, the user inputs the SSID (or ESSID) and the BSSID into the text boxes 62a and 62b in a state where the network identifier inputting web page 62 is displayed using the web browser of the guest terminal 2 and the SSID (or ESSID) and the BSSID is transmitted to the HTTP server 110 when the button 62c is clicked. The SSID (or ESSID) and the BSSID of the access point 8 are able to be acquired without connection to the wireless LAN if the guest terminal 2 is in a location where it is able to receive radio waves from the access point 8. Here, instead of S304, a program of the guest terminal 2 (for example, JavaScript, Active X, VB Script, or the like which are programs which transmit a printing instruction application from the printing control server 1) may automatically acquire the SSID (or ESSID) and the BSSID which are network identifiers of the access point 8 and may transmit the SSID (or ESSID) and the BSSID to the HTTP server 110.

Figure 6C:
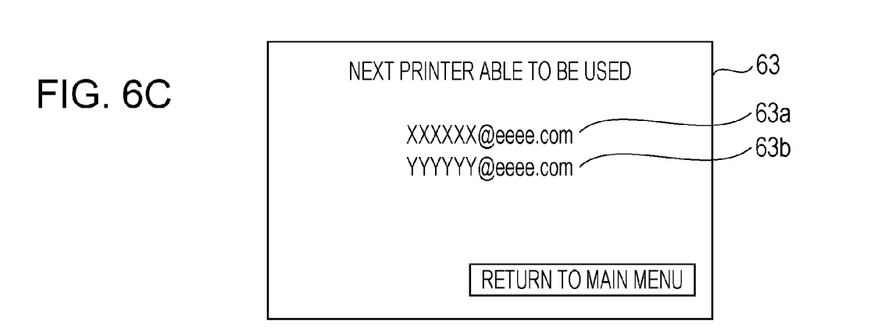

When the network identifier is acquired, the printing control server 1 transmits an electronic mail address for receiving the printing request with regard to the printer which corresponds to the acquired network identifier to the transmission origin of the search request as the printer identifier (S306 and S308). Specifically, when the HTTP server 110 acquires the SSID (or ESSID) and the BSSID, the account management AP server 107 acquires the electronic mail address which is stored so as to be linked to the SSID (or ESSID) and the BSSID from the DB server 106 (S306) and the search result web page which includes the electronic mail address which has been acquired is transmitted to the guest terminal 2 via the HTTP server 110 (S308). For example, as shown in FIG. 6C, a search result web page 63 includes two electronic mail addresses 63a and 63b in the case where there are two printers which are registered to correspond to the access point 8.

As a result, the user of the guest terminal 2 acquires the electronic mail address via the search result web page and is able to set the electronic mail address which has been acquired as the destination of the printing request to the printer 4. Here, in a case where there are N of the printers which are registered in the printing control server 1 so as to correspond to the wireless LAN of the access point 8 from which radio waves reach until the guest terminal 2, the user acquires N of the electronic mail addresses 63a and 63b as shown in FIG. 6C. If there is a case where there are no printers which are registered in the printing control server 1 so as to correspond to the wireless LAN of the access point 8, this is notified to the user and the electronic mail address is not displayed.

The user selects one from the printers which are registered to correspond to the access point 8 using the guest terminal 2, specifies one of the electronic mail addresses which correspond to the printer which is selected from the plurality of electronic mail addresses which are displayed, and generates and transmits a printing request electronic mail with the electronic mail address which has been specified as the destination. The printing control server 1 which receives the printing request generates a printing job according to the printing request (S302). Specifically, the printing request is received by the data conversion service AP server 102 via the SMTP server 101. The data conversion service AP server 102 analyses the electronic mail which is the printing request, extracts the main body and the attached file, and allocates an internal ID and a job ID to each file with regard to the main body and the attached file which are extracted. Here, the data conversion service AP server 102 allocates the internal ID which is linked to the electronic mail address which is the destination of the printing request by being acquired from the DB server 106 as the internal ID which is allocated to the printer 4. Next, the data conversion service AP server 102 converts the main body and the attached file for each job ID to a printing data format using the data conversion server 103. When the printing data is generated, the data conversion service AP server 102 stores the printing data as the printing job in the DB server 106 so as to be linked to the internal ID and the job ID and transfers the job ID to the printer communication AP server 105.

Next, the printing control server 1 transmits the printing waiting information to the guest terminal 2 which is the request origin of the printing execution request using XMPP (S320). Specifically, the printer communication AP server 105 notifies the printer 4 of the printing waiting information using XMPP in the same manner as S128 of the setup sequence. The process from the receiving of the printing request up until the transmission of the printing waiting information to the printer 4 in this manner is able to be automatically executed by the printing control server 1 since the printing waiting information is transmitted using XMPP and polling from the printer 4 is not necessary. As a result, it is possible for the generation of the printing job to be immediately notified to the printer 4, and in addition, it is possible for the printer 4 to be notified of the generation of the printing job with the minimum amount of communication.

The printer 4 which acquires the printing waiting information transmits the reception result (success or failure) to the printing control server 1 in the same manner as S138 of the setup sequence (S322).

Next, in the same manner as S140, the printer 4 requests the printing job information which is necessary for acquiring the printing data to the printing control server 1 using HTTP (S324). Specifically, the printer 4 transmits the internal ID of the printer 4 to the URL of the HTTP server 108 which corresponds to the request of the printing job information using HTTP.

The printing control server 1 which receives the request for printing job information transmits the reception result (success or failure), the job ID, the URL of the HTTP server 108 which corresponds to the job ID, and the type of page description language of the printing job to the printer 4 as printing job information using HTTP in the same manner as S142 (S326). In the case where the printing target is formed from a plurality of files, a job ID and a URL for each file are transmitted to the printer 4 as the printing job information.

The printer 4 which acquires the printing job information waits for the printer 4 to be in an idle state and requests the transmission of the printing data by transmitting the URL which corresponds to the job ID to the HTTP server 108 when the printer 4 is in an idle state in the same manner as S146 (S328). At this time, the printer 4 requests the transmission of the printing data to the URL which is different for each job ID in a case where a plurality of the job IDs are included in the printing job information which has been acquired.

The HTTP server 108 to which the transmission of the printing job information is requested transmits the reception result (success or failure) and the printing data which corresponds to the URL which receives the printing data acquisition request to the printer 4 using HTTP in the same manner as S148 (S330).

The printer 4 which acquires the printing data executes the printing based on the printing data in the same manner as S150 (S332).

The printer 4 which has completed printing transmits the execution result information of the printing job to the HTTP server 108 in the same manner as S154 (S334).

The printing control server 1 which acquires the execution result information in the HTTP server 108 updates the printing job based on the execution result information in the same manner as S156 (S336). Here, the content management AP server 109 deletes the printing job which is stored in the DB server 106 to so to be linked to the job ID which was acquired from the execution result information.

Next, the printing control server 1 transmits the execution result (success or failure) of the printing request to the guest terminal 2 which is the transmission origin of the printing request using an electronic mail (S338). Specifically, the content management AP server 109 generates an electronic mail where text which indicates that the printing is complete or has failed based on the execution result information and the printing target where printing is complete or has failed is the main body and the destination is the guest terminal 2 which is the transmission origin of the printing request and transmits the electronic mail which has been generated to the guest terminal 2 via the SMTP server 101.

When the guest terminal 2 receives the electronic mail (S340), the user of the guest terminal 2 is able to know the processing result of the printing request.

The processes from S328 to S340 in the embodiment are executed for each printing job in the order which is stored in the DB server 106. For example, in a case where a job ID which corresponds to the main body of an electronic mail and a job ID which corresponds to an attached file "A" are included in the printing job information which has been acquired and the printing job which corresponds to the main body of the electronic mail is stored first in the DB server 106, the printer 4 executes printing by acquiring the printing data which corresponds to the main body of the electronic mail by transmitting a first URL which corresponds to the main body of the electronic mail to the HTTP server 108 and transmits the execution result information to the HTTP server 108. When the HTTP server 108 receives the execution result information, the content management AP server 109 deletes the printing job which corresponds to the main body of the electronic mail from the DB server 106 based on the execution result information which has been acquired from the HTTP server 108. Then, the content management AP server 109 transmits that the printing job which corresponds to the main body of the electronic mail is complete to the guest terminal 2 using an electronic mail via the SMTP server 101. Next, the printer 4 executes printing by acquiring the printing data which corresponds to the attached file "A" by transmitting a second URL which corresponds to the attached file "A" to the HTTP server 108 and transmits the execution result information to the HTTP server 108. When the HTTP server 108 receives the execution result information, the content management AP server 109 deletes the printing job which corresponds to attached file from the DB server 106 based on the execution result information which has been acquired from the HTTP server. Then, the content management AP server 109 transmits that the printing job which corresponds to the attached file is complete to the guest terminal 2 using an electronic mail via the SMTP server 101.

In the printing sequence which is described above, even if there is no notification of an electronic mail from the management user, an arbitrary user which is able to receive radio waves from the access point 8 searches for the printer 4 which is registered in the printing control server 1 and is able to execute printing using the printer 4 which has been found. In addition, since the printing control server 1 converts the printing target to printing data, it is not necessary for a printer driver which corresponds to the printer 4 to be installed in the guest terminal 2 which uses the printer 4. In this manner, the printing control server 1 makes it possible for an unspecified large number of users to easily use the printer which is connected to a wireless LAN.

5. Other Embodiments

Here, the technical scope of the invention is not limited to the embodiment described above and it is obvious that various modifications may be added in the range which does not depart from the concept of the invention.

Figure 7:
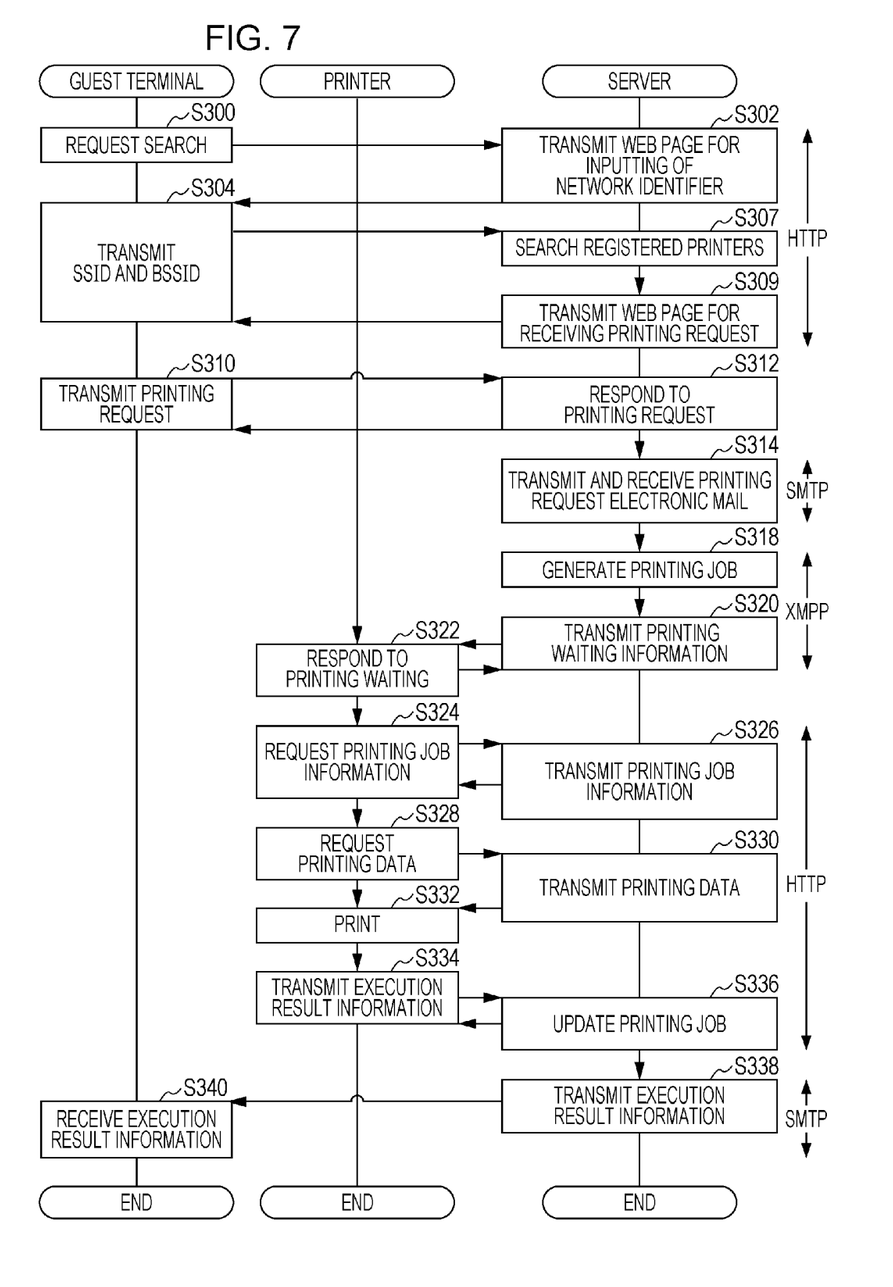
FIG. 7 is a sequence diagram illustrating a search sequence and a printing sequence.

For example, an example has been described in the embodiment described above where the printing control server 1 receives a printing request using an electronic mail, but the printing control server 1 may receive a printing request via a web page as will be described next. FIG. 7 illustrates a printing sequence in a case where the printing control server 1 receives a printing request via a web page and the process which have already been described have the same reference numeral attached.

In S307 which follows the process of S304 which has already been described, the account management AP server 107 which acquires the SSID and the BSSID from the guest terminal 2 via the HTTP server 110 acquires the internal ID which is stored so as to be linked to the SSID and the BSSID which have been acquired from the DB server 106.

Figure 6D:
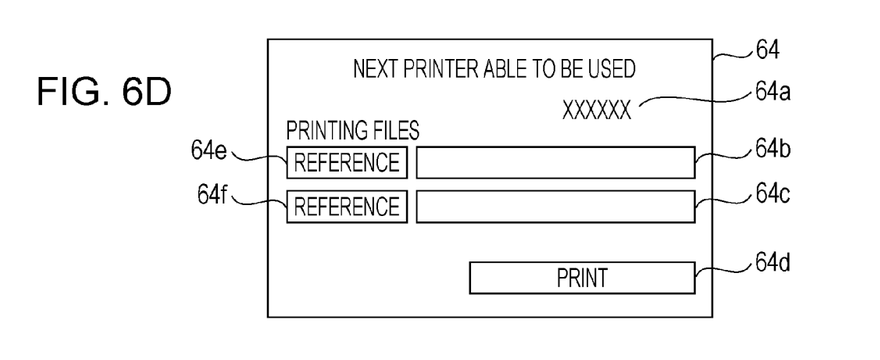

In S309, the account management server 107 transmits a printing request reception web page which is linked to the internal ID which is acquired from the DB server 106 via the HTTP server 110 to the guest terminal 2. For example, as shown in FIG. 6D, the printing request reception web page includes one or more printer internal IDs 64*a*, buttons 64*e* and 64*f* for specifying the printing target file by calling up a file management system, text boxes 64*b* and 64*c* for inputting and displaying the file name of the printing target, and button 64*d* for transmitting the printing request so as to be linked to the internal ID which is stored so to be linked with the SSID and the BSSID. By the account management AP server 107 storing a URL which is embedded in the button 64*d* and the internal ID so as to be linked, it is possible to link the printing request reception web page and the internal ID. Here, in a case where there are a plurality of printers where registration has been completed which are connected to the access point 8 from which the guest terminal 2 receives radio waves, the internal ID of the printer is included in all printing request reception web pages and the user may select any of the internal IDs, but the account management server 107 may select any of the internal IDs and include the one internal ID which has been selected in the printing request reception web page or the internal ID may not be included in the printing request reception web page if it is possible to link the internal ID and the printing request.

The guest terminal 2 which receives the printing request reception web page sets the printing target file in the printing request reception web page and transmits the printing target file which is set as the printing request in the printing control server 1 via the printing request reception web page (S310). Specifically, for example, the user inputs the file name of the file which is the printing target in the text boxes 64*b* and 64*c* of a printing request reception web page 64 using the web browser and the file which has the file name which is input into the text boxes 64*b* and 64*c* is transmitted from the guest terminal 2 to the URL of the HTTP server 110 which is embedded in the button 64*d* when the button 64*d* is clicked. By the URL which is embedded in the button 64*d* being linked to the internal ID to the printer 4 which are connected to the access point 8 from which the guest terminal 2 receives radio waves, the transmission of the printing request via the printing request reception web page 64 is able to be uniquely specified as the printing target with regard to the printer 4 in the account management AP server 107.

When the HTTP server 110 acquires the printing target file, the account management AP server 107 acquires the internal ID which is stored to as to be linked to the URL of the HTTP server 110 which receives the printing target file and acquires the electronic mail address, which is stored so as to be linked to the internal ID which has been acquired, from the DB server 106. Next, the account management AP server 107 transmits an electronic mail with the electronic mail address which has been acquired as the destination which is attached to the printing target file which is acquired from the HTTP server 110 to the data conversion AP server 102 via the SMTP server 101. As a result, the data conversion AP server 102 receives the electronic mail which is the printing request with regard to the printer 4 (S314).

In this manner, it is possible for printing to be executed by the printer in the same manner as the sequence which was described based on FIG. 5 by the printing control server 1 acquiring the printing request from the guest terminal 2 via the web page and receiving and transmitting the printing request which has been acquired as the electronic mail. In addition, it is of course possible for the printing control server 1 to generate the printing job from the printing request which is acquired via the web page with transmitting and receiving electronic mails in a case where the printing control server 1 acquires the printing request via the web page.

In addition, a printing instruction program which is operated by the guest terminal 2 may perform part or all of the operations of the guest terminal 2 side without using electronic mails or web pages.

In addition, at the stage where the registration request is transmitted from the printer to the printing control server, the SSID (or the ESSID) and the BSSID of the wireless LAN to which the printer 4 is connected may be transmitted to the printing control server 1.

In addition, an example has been described in the embodiment described above where the printer 4 is registered in the printing control server 1 by operating the management terminal 3, but the printer 4 may be registered in the printing control server 1 by the user I/F 46 of the printer 4 being operated by the user.

In addition, the identifier of the wireless LAN may not be included in the registration request. Even in this case, there is no hindrance to the search sequence since the printer information which includes the identifier of the wireless LAN are transmitted from the printer 4 in S116 and S206.

In addition, in the search sequence, the user of the guest terminal 2 may transmit the search request using an electronic mail. In this case, an electronic mail which describes the identifier of the wireless LAN access point (for example, which correspond to the wireless LAN which is sent from the printer side which is stored in the DB server such as SSID, ESSID, and BSSID) from which the guest terminal 2 receives radio waves is transmitted as the search request with regard to an electronic mail address for inquiring of electronic mails. Then, the printing control server 1 transmits by describing the electronic mail address, which is for receiving the printing request with regard to the printer which corresponds to the identifier of the wireless LAN access point which has been acquired, in a reply mail with regard to the search request which is sent with regard to the electronic mail address for inquiring of electronic mails.

In addition, it is described in the embodiment described above such that specification is performed by the user by displaying the electronic mail address, but since it may be difficult to understand which printer the electronic mail address corresponds to, selection may be performed by a comment for easily identifying the printer such as "in front of reception at oo city office", "front reception at ΔΔ hotel", or "printing corner at xx event site" along with the electronic mail address. In this case, for example, a comment is set in advance at the printer, the comment which is set in combination with when the SSID (or the ESSID) and the BSSID of the wireless LAN are notified from the printer to the printing control server and is stored in the DB server along with the SSID (or the ESSID) and the BSSID.

In addition, the electronic mail address of which there is notification by the server in accordance with the search request may be provided for a limited time, may be provided with a limit where a limit on the number of times of use is provided, or may be created to correspond to a corresponding printer. Even in this case, it is possible for the user of the guest terminal 2 to perform printing, but it is possible to prevent an unlimited amount of printing being performed against the intention of the owner of the printer.

Furthermore, an example is shown in the embodiment described above where the printer 4 automatically executes printing job when the printing waiting information is received from the printing control server 1, but for example, information which indicates the existence of the printing job may be displayed in the user I/F 46 of the printer 4 which receives the printing waiting information and the printer 4 may execute the printing job by waiting for a printing job execution instruction by the user.

In addition, an example is described in the embodiment described above where the printing control server 1 is configured using a plurality of server computers which are physically independent, but the functions of the printing control server 1 are able to be executed by a single server computer.

In addition, the communication protocol of the printer 4 and the printing control server 1 is able to be replaced with a push-type protocol other than XMPP (a protocol where a request from a client for execution of the process with regard to the client from a server is not necessary) and is able to be replaced with a pull-type communication protocol (a protocol where a process with regard to the client from the server is necessarily executed according to a request from the client). In addition, communication using HTTP is able to be replaced with another pull-type communication protocol and is able to be replaced with a push-type protocol.

What is claimed is:

1. A printing control server comprising:
    a storage section which stores a printer identifier, which is allocated to a predetermined printer, and a network identifier, which is an identifier of a wireless LAN to which the printer is connected, so as to be linked;
    a search response section which acquires the network identifier from a transmission origin of a search request when the search request has been received and transmits information, which is able to determine the printer identifier stored so as to be linked to the acquired network identifier, to the transmission origin of the search request;
    a printing request reception section which receives a printing request which includes a printing target and is linked to a printer identifier;
    a printing data preparation section which prepares printing data based on the printing target; and
    a printing data transmission section which transmits the printing data to the printer which corresponds to the printer identifier which is linked to the printing request.

2. The printing control server according to claim 1,
    wherein the search response section transmits information on a plurality of the printer identifiers to the transmission origin of a search request so that one is selected from the information on the plurality of printer identifiers in a case where there is the plurality of printer identifiers which are stored so as to be linked to the network identifier which is acquired from the transmission origin of the search request.

3. The printing control server according to claim 1,
    wherein the search response section transmits a web page for inputting to the transmission origin of a search request when the search request has been received, acquires the network identifier via the web page for inputting, and transmits a search request web page, which is linked to the printer identifier stored so as to be linked to the acquired network identifier, to the transmission origin of the search request as information which is able to determine the printer identifier.

4. The printing control server according to claim 1,
    wherein the storage section stores an electronic mail address which is allocated to the predetermined printer so as to be linked to the printer identifier as a registration electronic mail address and the printing request reception section receives an electronic mail with the registration electronic mail address as a destination as a printing request.

5. The printing control server according to claim 1, wherein the wireless LAN identifier is an SSID and a BSSID.

6. A communication terminal, with regard to a printing control server which is provided with a storage section which stores a printer identifier, which is allocated to a predetermined printer, and a network identifier, which is an identifier of a wireless LAN to which the printer is connected, so as to be linked, a search response section which acquires the network identifier from a transmission origin of a search request when the search request has been received and transmits information, which is able to determine the printer identifier stored so as to be linked to the acquired network identifier to the transmission origin of the search request, a printing request reception section which receives a printing request which includes a printing target and is linked to a printer identifier, a printing data preparation section which prepares printing data based on the printing target, and a printing data transmission section which transmits the printing data to the printer which corresponds to the printer identifier which is linked to the printing request, comprising:
- a search request transmission section which transmits a search request;
- a network identifier transmission section which transmits a network identifier; and
- a printing request transmission section which receives information which is able to determine the printer identifier and transmits a print request which is linked to a printer identifier and includes a print target.

7. A nonvolatile recording medium, which stores a communication program which is executed in a communication terminal, with regard to a printing control server which is provided with
- a storage section which stores a printer identifier, which is allocated to a predetermined printer, and a network identifier, which is an identifier of a wireless LAN to which the printer is connected, so as to be linked,
- a search response section which acquires the network identifier from a transmission origin of a search request when the search request has been received and transmits information, which is able to determine the printer identifier stored so as to be linked to the acquired network identifier,
- a printing request reception section which receives a printing request which includes a printing target and is linked to a printer identifier,
- a printing data conversion section which generates printing data based on the printing target, and
- a printing data transmission section which transmits the printing data to the printer which corresponds to the printer identifier which is linked to the printing request,
- a search request transmission function which transmits a search request;
- a network identifier transmission function which transmits a network identifier; and
- a print request transmission function which receives information which is able to determine the printer identifier and transmits a print request which is linked to a printer identifier and includes a print target.

* * * * *